(12) United States Patent
Nam et al.

(10) Patent No.: US 8,387,092 B2
(45) Date of Patent: Feb. 26, 2013

(54) DISPLAY APPARATUS AND INFORMATION SAVING METHOD THEREOF

(75) Inventors: Kyung-chul Nam, Suwon-si (KR); Doo-hee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 650 days.

(21) Appl. No.: 11/763,488

(22) Filed: Jun. 15, 2007

(65) Prior Publication Data

US 2008/0092167 A1    Apr. 17, 2008

(30) Foreign Application Priority Data

Oct. 11, 2006  (KR) .................. 10-2006-0098749

(51) Int. Cl.
*H04N 5/445*     (2011.01)
(52) U.S. Cl. .......................... 725/43; 725/40
(58) Field of Classification Search .............. 725/37, 725/40–47
See application file for complete search history.

(56) References Cited

U.S. PATENT DOCUMENTS

| | | | |
|---|---|---|---|
| 2001/0027122 A1 | 10/2001 | Tanaka et al. | |
| 2001/0037500 A1* | 11/2001 | Reynolds et al. | 725/36 |
| 2002/0016965 A1* | 2/2002 | Tomsen | 725/42 |
| 2002/0083464 A1* | 6/2002 | Tomsen et al. | 725/112 |
| 2003/0005432 A1* | 1/2003 | Ellis et al. | 725/13 |
| 2003/0133042 A1 | 7/2003 | Lee et al. | |
| 2005/0097607 A1* | 5/2005 | Kummer et al. | 725/58 |
| 2005/0097622 A1* | 5/2005 | Zigmond et al. | 725/135 |

FOREIGN PATENT DOCUMENTS

| | | |
|---|---|---|
| EP | 0 993 183 A2 | 4/2000 |
| EP | 1 387 571 A1 | 2/2004 |
| JP | 2000-354225 A | 12/2000 |
| JP | 2002-232370 A | 8/2002 |
| JP | 2005-159854 A | 6/2005 |
| KR | 10-2004-0103194 A | 12/2004 |
| KR | 10-2005-0093554 A | 9/2005 |

OTHER PUBLICATIONS

Communication dated Nov. 8, 2012 issued by the European Patent Office in counterpart European Patent Application No. 07111851.7.
Communication dated Nov. 15, 2012 issued by the Korean Intellectual Property Office in counterpart Korean Patent Application No. 10-2006-0098749.

* cited by examiner

*Primary Examiner* — Nicholas Corbo
(74) *Attorney, Agent, or Firm* — Sughrue Mion, PLLC

(57) ABSTRACT

A display apparatus includes: a saving part; a user inputting part; a receiving part which receives broadcasting signal including at least one data information; a signal processing part which performs signal processing by extracting the data information from the received broadcasting signal; and a controlling part which enables a user to determine whether to save the data information through the user inputting part if the data information is received, and controls the signal processing part to save the data information determined to be saved in the saving part.

19 Claims, 3 Drawing Sheets

DISPLAY APPARATUS AND INFORMATION SAVING METHOD THEREOF

CROSS-REFERENCE TO RELATED APPLICATIONS

This application claims priority from Korean Patent Application No. 2006-0098749, filed on Oct. 11, 2006 in the Korean Intellectual Property Office, the disclosure of which is incorporated herein by reference.

BACKGROUND OF INVENTION

1. Field of Invention

Apparatuses and methods consistent with the present invention relate to a display apparatus and information saving method thereof, and more particularly to a display apparatus which can receive and save data information and information saving method of the display apparatus.

2. Description of the Related Art

A display apparatus receives broadcasting signals transmitted from a broadcasting station and displays images to be watched. As digital broadcasting has lately started, data information comprised in broadcasting signals can be received and images can be displayed by a digital TV. The data information received by the digital TV includes not only the data information related to a program but also the independent data information of the program such as traffic information and weather information.

However, as all data information which is received along with image signals is saved by a conventional digital TV, unnecessary data information which is not demanded by a user is also saved. Therefore, a storage space is wasted and processing speed of the data information is decreased. Especially, as the data information which is independent of the image signals is usually provided in real time, there is a need to save only the data information which the user needs.

SUMMARY OF THE INVENTION

Accordingly, it is an aspect of the present invention to provide a display apparatus and information saving method thereof which enables a user to determine whether to save data information included in image signals before saving the data information, thereby reducing a capacity of a storage medium in which the data information is saved, and rapidly processing the data information.

Additional aspects of the present invention will be set forth in part in the description which follows and, in part, will be obvious from the description, or may be learned by practice of the present invention.

The foregoing and/or other aspects of the present invention can be achieved by providing a display apparatus comprising: a saving part; a user inputting part; a receiving part which receives broadcasting signal including at least one data information; a signal processing part which performs signal processing by extracting the data information from the received broadcasting signal; and a controlling part which enables a user to determine whether to save the data information through the user inputting part if the data information is received, and controls the signal processing part to save the data information determined to be saved in the saving part.

According to an aspect of the invention, the display apparatus further comprises a displaying part, and a user interface (UI) generating part which generates a UI for determining whether to save the data information, wherein the controlling part controls the UI to be displayed on the displaying part for enabling the user to determine whether to save the data information.

According to an aspect of the invention, the received data information comprises the data information corresponding to a currently selected channel among a plurality of channels.

According to an aspect of the invention, the received data information comprises the data information which is independent of image information of the currently selected channel.

According to an aspect of the invention, transmission standard of the received data information comprises one of Advanced Common Application Platform (ACAP), Open Cable Application Platform (OCAP) and Multimedia Home Platform (MHP).

According to an aspect of the invention, the display apparatus further comprises a connecting part, wherein the controlling part controls the signal processing part to transmit the data information determined to be saved to an outer storage medium through the connecting part if the outer storage medium is connected to the connecting part.

According to an aspect of the invention, the connecting part complies with an Institute of Electrical and Electronics Engineers (IEEE) 1394 interface specification.

The foregoing and/or other aspects of the present invention can be achieved by providing an information saving method of a display apparatus, comprising: receiving a broadcasting signal which includes at least one data information; receiving a user's input on whether to save the data information; extracting the data information which the user has determined to save from the broadcasting signal; and saving the extracted data information.

According to an aspect of the invention, the received data information comprises the data information corresponding to a currently selected channel among a plurality of channels.

According to an aspect of the invention, the received data information comprises the data information which is independent of image information of the currently selected channel.

According to an aspect of the invention, the receiving the user's input about whether to save the data information comprises displaying a UI for determining whether to save the data information, and receiving the user's input whether to save the data information through the UI.

According to an aspect of the invention, transmission standard of the received data information comprises one of Advanced Common Application Platform (ACAP), Open Cable Application Platform (OCAP) and Multimedia Home Platform (MHP).

According to an aspect of the invention, the saving the extracted data information comprises saving the data information in an outer storage medium connected to the display apparatus.

According to an aspect of the invention, an interface specification for transmitting the data information to the outer storage medium complies with an IEEE 1394 interface specification.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
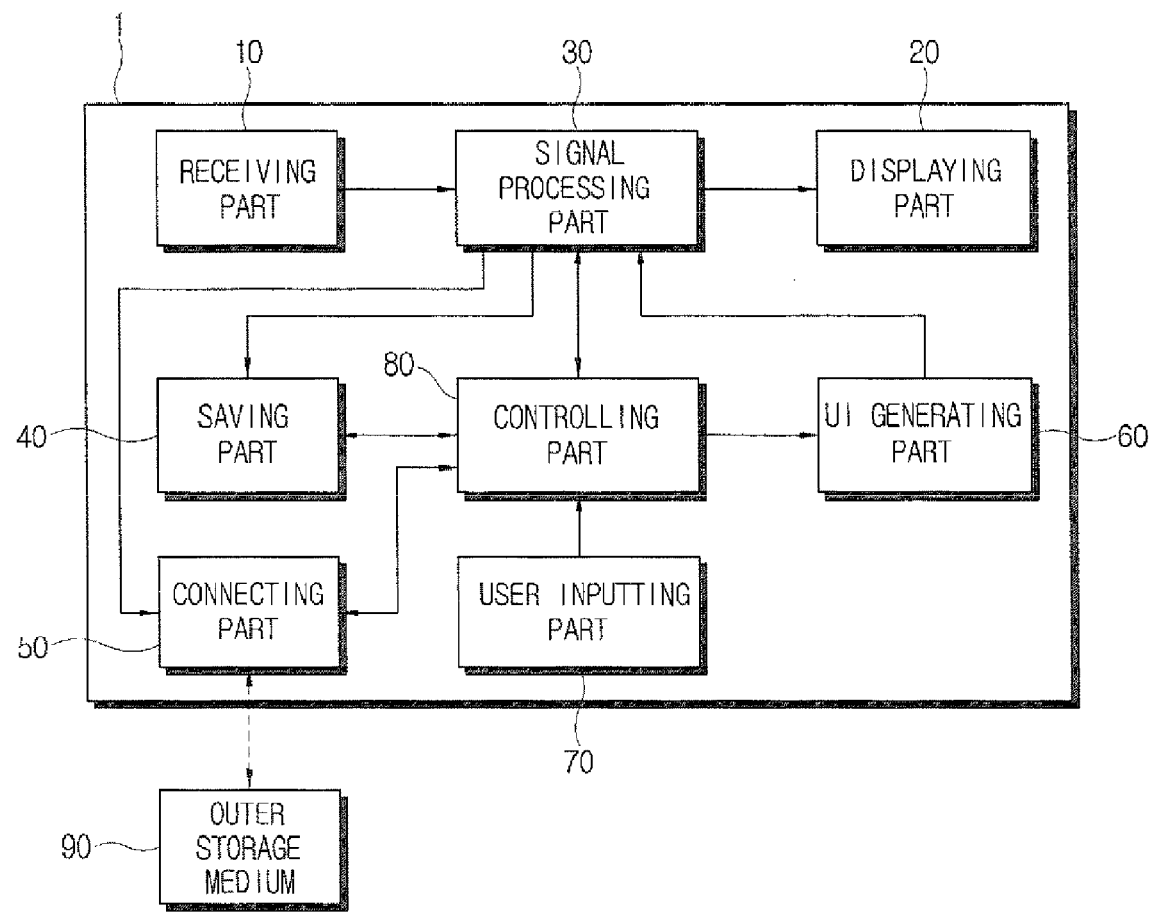
FIG. 1 is a block diagram to explain configuration of a display apparatus according to an exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

As shown in FIG. 1, a display apparatus 1 according to the present invention comprises a receiving part 10, a displaying part 20, a signal processing part 30, a saving part 40, a connecting part 50, a UI generating part 60, a user inputting part 70 and a controlling part 80. A digital TV may be used as the display apparatus 1 according to the exemplary embodiments of the present invention.

The receiving part 10 receives a broadcasting signal in which data information is included. In this exemplary embodiment, the data information means data service information which is received along with audio signals and video signals through the same stream. A tuner may be used as the receiving part 10 according to the exemplary embodiments of the present invention.

The specification for the receiving part 10 to receive the broadcasting signals according to the exemplary embodiments of the present invention includes US specifications for data broadcasting such as Advanced Common Application Platform (ACAP) and Open Cable Application Platform (OCAP), and European Specifications such as Multimedia Home Platform (MHP).

The displaying part 20 displays images on the basis of image signals processed by the signal processing part 30 which will be described later. Also, the displaying part 20 displays UI image which is used for determining whether to save the data information generated by the UI generating part 60 to be described later, thus enabling the user to select the data information without difficulty. An exemplary embodiment of the displaying part 20 according to the present invention may be a cathode ray tube (CRT), a liquid crystal display (LCD), a plasma display panel (PDP), a digital light processing (DLP) device, a surface-conduction electron-emitter display (SED), a field emission display (FED) or etc.

The signal processing part 30 performs data processing of extracting data information from the broadcasting signal which has been received by the receiving part 10. The signal processing part 30 comprises a demultiplexer (not shown) which divides the received broadcasting signal into a video stream, an audio stream and a data stream, a decoder (not shown) which decodes data stream selected by the user among the divided data stream, and a multiplexer (not shown) which transmits the decoded data to an output circuit for enabling the transmitted data to be saved in the saving part 40.

Also, by control of the controlling part 80 to be described later, the signal processing part 30 may perform signal processing by multiplexing the data stream selected by the user to video stream or audio stream for enabling the multiplexed data stream to be saved in the saving part 40.

The signal processing part 30 may perform decoding to extract image information from input image signal, scaling to adjust resolution of the decoded image according to characteristics of the displaying part 20 and user settings, picture enhancement to enhance image quality, and etc.

By control of the controlling part 80, the saving part 40 saves the data information among the broadcasting signals received by the receiving part 10. The exemplary embodiment of the saving part 40 according to the present invention may be a hard disk or etc.

The connecting part 50 is connected to an outer storage medium 90 and transmits only the data information, which the user has determined to save, by control of the controlling part 80. A memory stick may be an embodiment of the outer storage medium 90. Also, a personal computer may be an exemplary embodiment of the outer storage medium 90. In this case, i the connecting part 50 according to the exemplary embodiments of the present invention may comply with IEEE 1394 interface specification by which data can be transmitted and received between the connecting part 50 and the personal computer. Therefore, according to the exemplary embodiments of the present invention, only the data information which is selected by the user among data information received periodically from data carousel can be saved.

The UI generating part 60 generates UI for determining whether to select the data information which is included in the broadcasting signals. The UI generated by the UI generating part 60 may comprise UI related to lists of the data information, and will be described later in detail.

The user inputting part 70 receives input of user's determination about whether to save the data information in the case that the data information is received. The user inputting part 70 may be provided at one side of the display apparatus 1 or in a remote control device.

The controlling part 80 enables the user to determine whether to save the data information through the user inputting part 70 in the case that the data information is received by the receiving part 10, and controls the signal processing part 30 to save the data information determined by the user in the saving part 40. An exemplary embodiment of the controlling part 80 according to the present invention may be a microcomputer, a software program or etc.

Also, if a connection of the outer storage medium 90 is sensed at the connecting part 50, the controlling part 80 may control the data information extracted by the signal processing part 30 to be saved in the outer storage medium 90 according to the user's decision.

The controlling part 80 may control the data information, which is included in the image signals corresponding to a currently selected channel among a plurality of channels, to be saved in the saving part 40 and the outer storage medium 90.

On the other hand, the display apparatus 1 according to the present invention may comprise only the receiving part 10, the signal processing part 30, the saving part 40, the user inputting part 70 and the controlling part 80. In this case, if the data information is received by the receiving part 10, the controlling part 80 may enable the user to determine whether to save the received data information through the user inputting part 70, and may enable the signal processing part 30 to save only the data information determined by the user in the saving part 40.

Hereinafter, an operation of the controlling part 80 in relation to the UI of the display apparatus 1 according to the exemplary embodiments of the present invention is described referring to FIG. 2.

Figure 2:
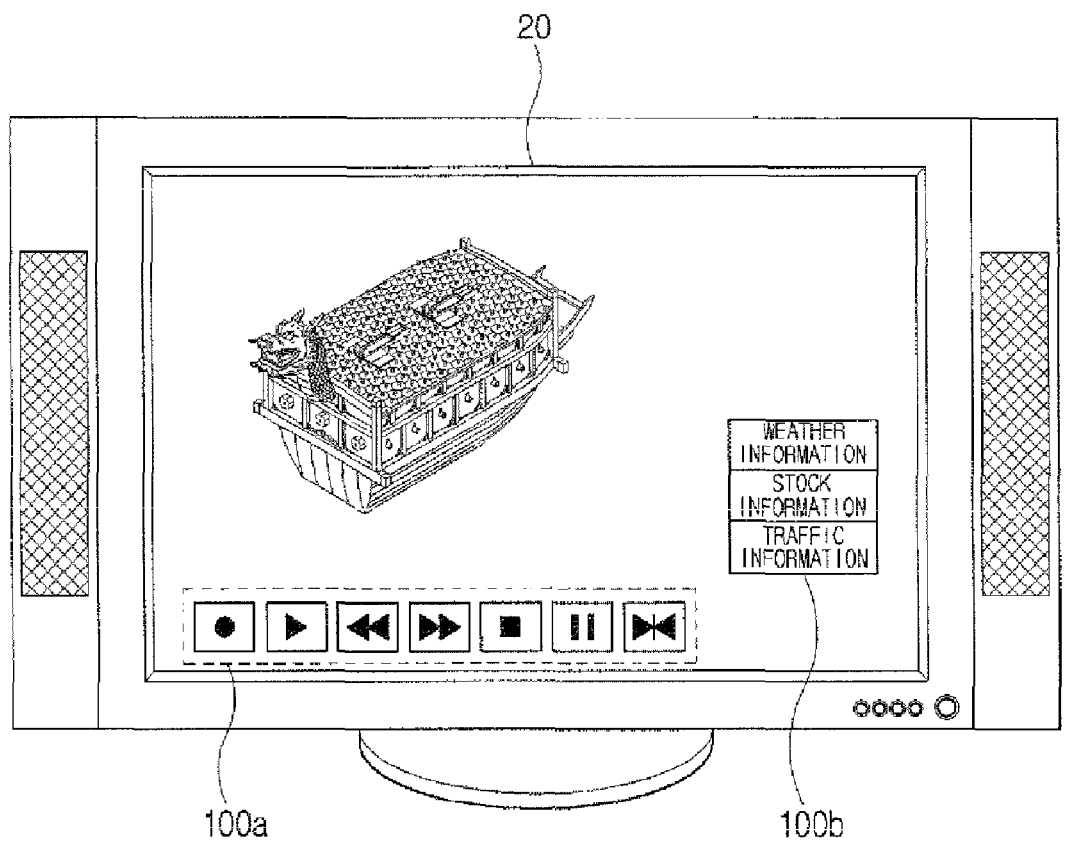
FIG. 2 shows a UI of the display apparatus according to an exemplary embodiment of the present invention.

As shown in FIG. 2, the UI of the display apparatus 1 according to the present invention comprises a saving interface 100a for saving the image and the data information which are currently displayed on the displaying part 20, and a list interface 100b for selecting at least one data information among a plurality of data information.

If there is a predetermined input through the user inputting part 70 when the saving interface 100a for saving the data information is displayed according to the user's direction, the controlling part 80 displays the list interface 100b of the currently received data information on the displaying part 20.

If the user executes a saving function included in the saving interface 100a when he/she has selected at least one data information through the list interface 10b, the controlling part 80 controls the signal processing part 30 to extract the data information which has been selected by the user among the data information received by the receiving part 10, and to save the extracted data information in the saving part 40 or the outer storage medium 90 connected to the connecting part 50.

Therefore, the user can easily save the data information using the UI displayed on the displaying part 20.

Figure 3:
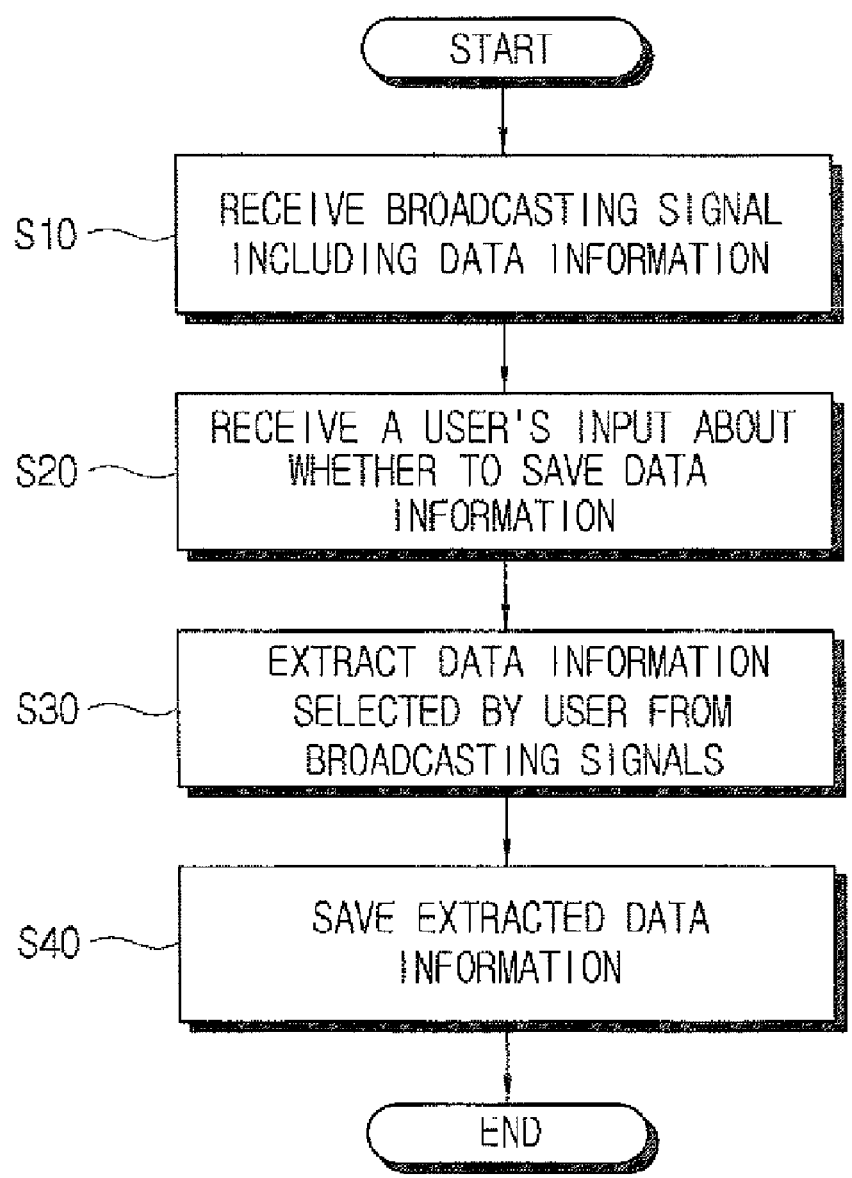
FIG. 3 is a flow diagram to explain information saving method according to an exemplary embodiment of the present invention.

Hereinafter, the information saving method of the display apparatus 1 according to the exemplary embodiments of the present invention is described referring to FIG. 3.

Firstly, the controlling part 80 controls the receiving part 10 to receive broadcasting signals including at least one data information at operation S10. Then, the controlling part 80 receives the user's input about whether to save at least one of the received broadcasting signals at operation S20. In operation S20, the user's input about whether to save the data information is received through the UI by displaying the list of the data information possible to be saved.

If the user determines whether to save the data information at operation S20, the controlling part 80 extracts the data information determined to be saved from the received broadcasting signals at operation S30. Then, the controlling part 80 saves the extracted data information in the saving part 40 at operation S40. In this case, if the connection of the outer storage medium 90 is sensed at the connecting part 50, the controlling part 80 may control the extracted data information to be saved in the outer storage medium 90.

As described above, according to the exemplary embodiments of the present invention, a display apparatus and information saving method thereof are provided that reduce the capacity of the storage medium included in the display apparatus, and rapidly process the data information, thereby saving and managing only the data information needed among collectively provided data information.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
   a saving part;
   a user inputting part;
   a receiving part which receives a broadcasting signal including a video signal and a plurality of data information;
   a signal processing part which performs signal processing by dividing the received broadcasting signal into the video signal and the plurality of data information and by extracting at least one data information from the plurality of data information;
   a displaying part which displays the plurality of data information to be divided and processed by the signal processing part; and
   a controlling part which enables a user to select at least one data information to be saved among the plurality of data information displayed in the displaying part through the user inputting part if the broadcasting signal including the video signal and the plurality of data information is received, and controls the signal processing part to extract the at least one data information selected to be saved by the user from the plurality of data information, and to save the extracted at least one data information selected to be saved in the saving part,
   wherein the displaying part displays the extracted at least one data information determined to be saved in the saving part, and
   wherein only the data information which is selected by the user among data information periodically received can be saved.

2. The display apparatus according to claim 1, wherein the received data information comprises the at least one data information corresponding to a currently selected channel among a plurality of channels.

3. The display apparatus according to claim 2, wherein the received data information comprises the at least one data information which is independent of image information of the currently selected channel.

4. The display apparatus according to claim 1, wherein transmission standard of the received at least one data information comprises one of Advanced Common Application Platform (ACAP), Open Cable Application Platform (OCAP) and Multimedia Home Platform (MHP).

5. The display apparatus according to claim 1 further comprising a connecting part,
   wherein the controlling part controls the signal processing part to transmit the at least one data information determined to be saved to an outer storage medium through the connecting part if the outer storage medium is connected to the connecting part.

6. The display apparatus according to claim 5, wherein the connecting part complies with an Institute of Electrical and Electronics Engineers (IEEE) 1394 interface specification.

7. An information saving method of a display apparatus, comprising:
   receiving a broadcasting signal which includes a video signal and a plurality of data information;
   processing the received broadcast signal by dividing the received broadcast signal into the video signal and the plurality of data information;
   displaying the plurality of data information included in the received broadcasting signal;
   receiving a user's input on whether to save at least one data information among the displayed plurality of data information;
   extracting the at least one data information which the user has selected to save among the plurality of data information;
   displaying the extracted at least one data information selected to be saved in the saving part; and
   saving the extracted at least one data information,
   wherein only the data information which is selected by the user among data information periodically received can be saved.

8. The information saving method of the display apparatus according to claim 7, wherein the received at least one data information comprises the at least one data information corresponding to a currently selected channel among a plurality of channels.

9. The information saving method of the display apparatus according to claim 8, wherein the received at least one data information comprises the at least one data information which is independent of image information of the currently selected channel.

10. The information saving method of the display apparatus according to claim 7, wherein the receiving the user's input on whether to save the at least one data information comprises displaying a User Interface (UI) for determining whether to save the data information, and
receiving the user's input whether to save the at least one data information through the UI.

11. The information saving method of the display apparatus according to claim 7, wherein transmission standard of the received data information comprises one of Advanced Common Application Platform (ACAP), Open Cable Application Platform (OCAP) and Multimedia Home Platform (MHP).

12. The information saving method of a display apparatus according to claim 7, wherein the saving the extracted at least one data information comprises saving the at least one data information in an outer storage medium connected to the display apparatus.

13. The information saving method of a display apparatus according to claim 12, wherein an interface specification for transmitting the at least one data information to the outer storage medium complies with an Institute of Electrical and Electronics Engineers (IEEE) 1394 interface specification.

14. A display apparatus comprising:
a saving part;
a user inputting part;
a receiving part which receives a broadcasting signal including a video signal and a plurality of data information;
a signal processing part which performs signal processing by dividing the received broadcasting signal into the video signal and the plurality of data information and by extracting at least one data information from the plurality of data information,
wherein the signal processing part comprises a multiplexer;
a displaying part which displays the plurality of data information to be divided and processed by the signal processing part; and
a controlling part which enables a user to select the at least one data information to be saved among the plurality of data information through the user inputting part if the broadcasting signal including the video signal and the plurality of data information is received, and controls the signal processing part to extract the at least one data information selected to be saved by the user from the plurality of data information, and controls the displaying part to display the extracted at least one data information determined to be saved in the saving part, and to multiplex the extracted at least one data information to the video signal by the multiplexer, and to save the multiplexed data stream in the saving part,
wherein only the data information which is selected by the user among data information periodically received can be saved.

15. An information saving method of a displaying apparatus, comprising:
receiving a broadcasting signal which includes a video signal and a plurality of data information;
displaying the signal processed by dividing the broadcast signal into the video signal and the plurality of data information;
receiving a user's input on whether to save the at least one data information among the plurality of data information;
extracting the at least one data information which the user has selected to save among the plurality of data information;
displaying the extracted at least one data information selected to be saved in the saving part;
multiplexing the extracted at least one data information to the video signal by a multiplexer which is included in a signal processing part; and
saving the multiplexed data stream in the saving part,
wherein only the data information which is selected by the user among data information periodically received can be saved.

16. The information saving method of a display apparatus according to claim 7, wherein:
the receiving the user's input on whether to save the at least one data information further comprises:
displaying a user interface (UI) for determining whether to save the data information,
receiving the user's input on whether to save the at least one data information through the UI, and
receiving another user's input on whether to save the video signal; and
the saving the extracted at least one data information comprises saving the video signal and the extracted at least one data information in response to the received user's input on whether to save the at least one data information and the received other user's input on whether to save the video signal.

17. The information saving method of a display apparatus according to claim 16, wherein the displayed UI is a UI for determining whether to save the data information and the video signal.

18. The information saving method of a display apparatus according to claim 17, wherein the saving the video signal and the extracted at least one data information comprises saving the video signal multiplexed together with the extracted at least one data information in response to the received user's input on whether to save the at least one data information and the received other user's input on whether to save the video signal.

19. The information saving method of a display apparatus according to claim 16, wherein the user's input and the other user's input are received through a same displayed UI for determining whether to save the data information and the video information.

* * * * *